(12) United States Patent
Begley et al.

(10) Patent No.: US 9,574,303 B2
(45) Date of Patent: Feb. 21, 2017

(54) METHOD OF RECOVERING PULPING CHEMICALS FROM DISSOLVED ASH HAVING A HIGH CARBONATE CONTENT

(71) Applicant: Veolia Water Technologies, Inc., Moon Township, IL (US)

(72) Inventors: Michael S. Begley, Lisle, IL (US); Thomas Anthony Pecoraro, Plainfield, IL (US)

(73) Assignee: Veolia Water Technologies, Inc., Moon Township, PA (US)

( * ) Notice: Subject to any disclaimer, the term of this patent is extended or adjusted under 35 U.S.C. 154(b) by 0 days.

(21) Appl. No.: 15/165,332

(22) Filed: May 26, 2016

(65) Prior Publication Data

US 2016/0348310 A1    Dec. 1, 2016

Related U.S. Application Data

(60) Provisional application No. 62/169,031, filed on Jun. 1, 2015.

(51) Int. Cl.
| | |
|---|---|
| *B01D 9/00* | (2006.01) |
| *D21C 11/14* | (2006.01) |
| *D21C 11/00* | (2006.01) |
| *C01D 7/24* | (2006.01) |
| *C01D 5/16* | (2006.01) |

(52) U.S. Cl.
CPC ................. *D21C 11/14* (2013.01); *C01D 5/16* (2013.01); *C01D 7/24* (2013.01); *D21C 11/0085* (2013.01)

(58) Field of Classification Search
CPC ........................................................ B01D 9/00
USPC ........................................................ 23/295 R
See application file for complete search history.

(56) References Cited

U.S. PATENT DOCUMENTS

| | | |
|---|---|---|
| 8,721,837 B2 | 5/2014 | Begley et al. |
| 2014/0027076 A1 | 1/2014 | Begley et al. |

FOREIGN PATENT DOCUMENTS

DE        273427 A1    11/1989

OTHER PUBLICATIONS

International Search Report mailed Jul. 25, 2016 in re International Application No. PCT/US2016/034957 filed May 31, 2016.

*Primary Examiner* — Edward Johnson
(74) *Attorney, Agent, or Firm* — Coats and Bennett PLLC

(57) ABSTRACT

A method of recovering wood pulping chemicals from black liquor produced in a wood pulping process where the process entails burning the black liquor in a recovery boiler to form ash containing high levels of carbonate as well as sodium, potassium and chloride. The ash is dissolved to form a dissolved ash solution that is directed to a first stage crystallization unit that concentrates the dissolved ash solution and which results in the precipitation of sodium sulfate and sodium carbonate. Thereafter the concentrated dissolved ash solution is directed to a second stage crystallization unit which adiabatically cools the concentrated dissolved ash solution to form a glaserite slurry and a purge stream that is rich in chloride. In order to reduce the tendency of sodium carbonate and burkeite to crystallize in the second stage crystallization unit and to encourage pure glaserite to crystalize in the crystallizer, the method entails mixing a sulfate source, such as sodium sulfate or sulfuric acid, to the concentrated dissolved ash solution upstream of the crystallizer.

13 Claims, 2 Drawing Sheets

METHOD OF RECOVERING PULPING CHEMICALS FROM DISSOLVED ASH HAVING A HIGH CARBONATE CONTENT

CROSS-REFERENCE TO RELATED APPLICATION

This application claims priority under 35 U.S.C. §119(e) from the following U.S. provisional application: Application Ser. No. 62/169,031 filed on Jun. 1, 2015. That application is incorporated in its entirety by reference herein.

FIELD OF THE INVENTION

The present invention relates to pulping wood, more particularly to the recovery of pulping chemicals.

BACKGROUND OF THE INVENTION

Many pulp mills employ what is known as the Kraft chemical recovery process. In this process, black liquor is burned in a recovery boiler and produces ash which includes sodium. Typically, the sodium is recovered from the ash in the form of sodium sulfate and sodium carbonate. Some ashes include a relatively high content of carbonate. In certain types of recovery processes, especially those employing a two-stage process, the presence of the high carbonate content in the ash impacts the overall efficiency of sodium recovery.

SUMMARY OF THE INVENTION

The present process relates to recovering pulping chemicals, sodium sulfate and sodium carbonate, from recovery boiler ash which is reused in an efficient Kraft recovery process. In some cases, the recovery process accumulates unacceptable levels of chloride and potassium which lead to corrosion and operation problems in the recovery process. The present process utilizes a two-stage process to remove potassium and chloride from the recovery boiler ash while recovering desirable sodium sulfate and sodium carbonate. In one embodiment, this two-stage process comprises a two stage crystallization process with the first stage crystallizing Sodium Sulfate, and Sodium Carbonate in an evaporative crystallizer (first stage) and a Cooling crystallization process (second stage). The second crystallization stage improves the overall recovery by crystallizing glaserite ($3K_2SO_4.Na_2SO_4$). In some cases, there is a relatively high carbonate content in the recovered ash and this has a tendency to cause sodium carbonate to crystallize in the second stage, limiting recovery of sodium in the two stage ash treatment process. To address this, sodium sulfate is added upstream of the second stage to allow for the crystallization of pure glaserite ($3K_2SO_4.NA_2SO_4$) in the second stage. The addition of sodium sulfate allows more crystallization to occur in the second stage before producing sodium carbonate. In addition, as an option, the second stage can be heated to improve recovery and allow for more flexibility in the operating temperature of the second stage. This process, including the selected addition of sodium sulfate upstream of the second stage, improves sodium recovery for high carbonate ashes.

Other objects and advantages of the present invention will become apparent and obvious from a study of the following description and the accompanying drawings which are merely illustrative of such invention.

DESCRIPTION OF EXEMPLARY EMBODIMENTS

Figure 1:
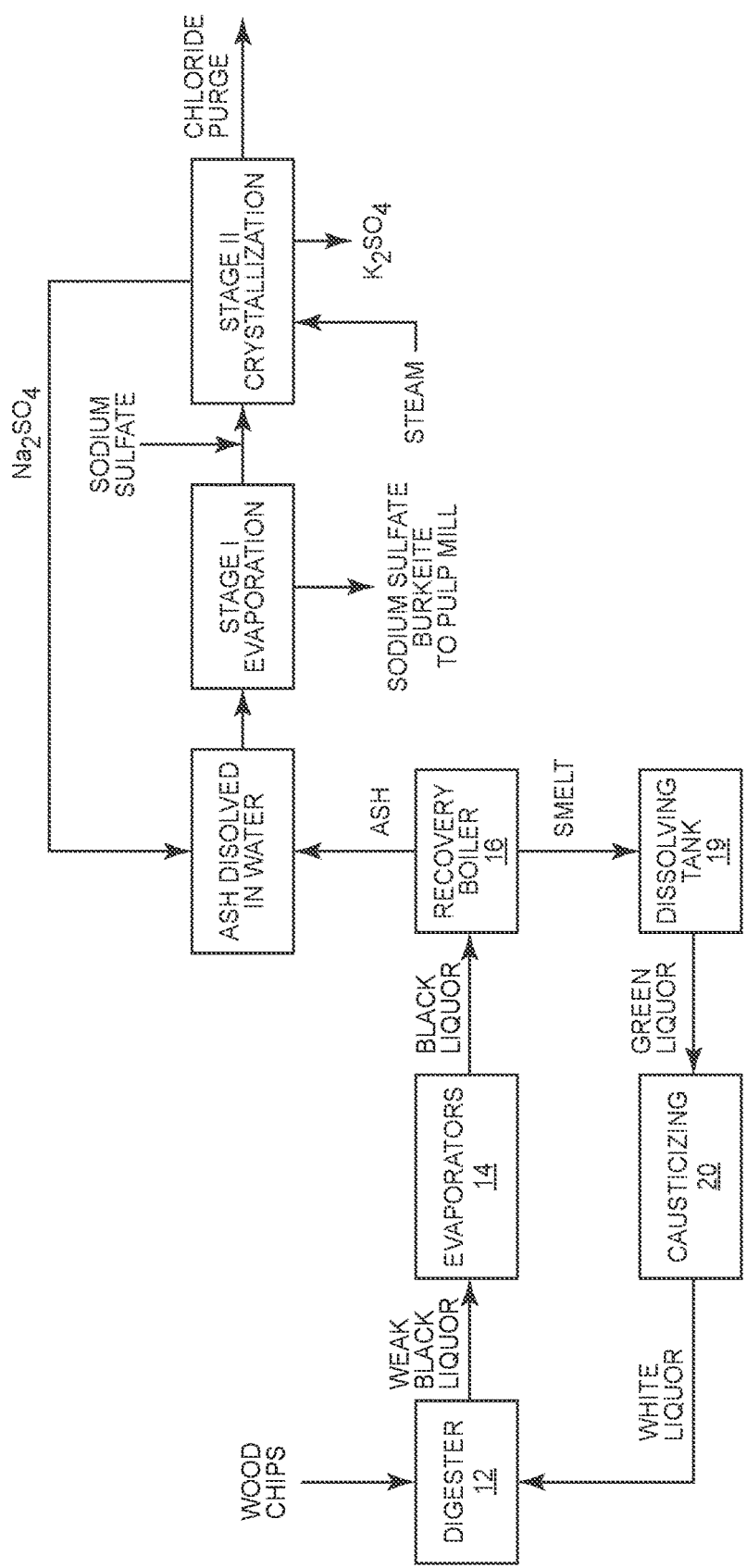
FIG. 1 is a schematic illustration showing a process for pulping wood, along with an associated chemical recovery process.

The present invention relates to a wood pulping process that entails recovering pulping chemicals from black liquor while reducing the concentration of potassium and chloride in the black liquor. Generally an exemplary wood pulping process entails digesting wood in a digester and separating pulp from the wood and producing black liquor. Thereafter, the black liquor is concentrated and directed to a recovery boiler. In the recovery boiler, the black liquor is burned and in the process produces ash that contains sodium, potassium sulfate, chloride and carbonate. The associated chemical recovery process focuses on removing sodium sulfate and sodium carbonate from the ash and re-using them in what is referred to as the efficient Kraft process. In the process of recovering sodium sulfate and sodium carbonate, it is desirable to remove chloride and potassium that is found in the ash. Chloride and potassium are concentrated in the ash formed during the combustion of black liquor in the recovery boiler. Chlorine (Cl), present in mills in the form of chloride, and potassium (K) are known to have a negative impact on the operation of chemical recovery processes in pulp mills. These elements, despite their small quantities in black liquor, can dramatically lower the melting temperature of fly ash deposits and contribute to severe fouling and corrosion of heat transfer tubes in recovery boilers.

The process described herein focuses on the recovery of sodium sulfate and sodium carbonate from the ash produced in the recovery boiler. This particular process addresses a case where the ash contains a relatively high carbonate content that tends to make it more difficult to efficiently recover sodium sulfate and sodium carbonate in a two-stage crystallization process that is particularly effective in removing the chloride and potassium. Where there is a relatively high carbonate content in the ash, sodium carbonate crystallization tends to occur in the second stage crystallization process. This impairs the recovery of pure glaserite ($3K_2SO_4.NA_2SO_4$) and that in turn impacts the overall efficiency of recovering sodium sulfate and sodium carbonate. To address this, sodium sulfate is added upstream of the second stage crystallization process. The addition of the sodium sulfate moves the chemistry in the second stage crystallization process into the glaserite field, allowing pure glaserite to crystallize in the second stage and avoid sodium carbonate and burkeite from crystallizing in the second stage. As discussed herein, steam can be added to the second stage crystallization process to increase crystallization and optimizing glaserite production and minimizing the amount of recycle back to the first stage. As discussed below, the addition of sodium sulfate can take place at various places upstream of the second stage crystallization process. As an alternative, the sodium sulfate could be added to the feed of the system rather than to the second stage. This would, however, require more sodium sulfate to prevent sodium carbonate crystallizing in the second stage. In addition, as an alternative, sulfuric acid could also be added to the second stage but the disadvantage here is the increased cost associated with that approach. In a preferred embodiment, however, the sodium sulfate would be added to the concentrate produced by the first stage crystallization process. This allows for an efficient utilization of the sodium sulfate.

Referring to FIG. 1, wood chips are fed into a digester 12. The wood chips are mixed with pulping chemicals typically referred to as white liquor. White liquor contains sodium hydroxide (NaOH) and sodium sulfide ($Na_2S$). Digester 12 is operated under pressure and, in a typical process, the wood chips are cooked at a temperature on the order of 160-180° C. White liquor in the digester neutralizes the organic acids in the chemical matrix of the wood. Lignins and other organic material dissolve into the white liquor. The remaining material is pulp or wood fiber used in the papermaking process. White liquor is discharged from the digester 12 and, once discharged, the white liquor is referred to as weak black liquor. Chemically, black liquor is a mixture of several basic chemical constituents where the largest fractions are carbon, oxygen, sodium, and sulphur. Other constituents typically found in black liquor include hydrogen, potassium, chlorine, and nitrogen.

The weak black liquor is sent to an evaporator or a series of evaporators 14 (such as multi-effect evaporators) where the weak black liquor is concentrated. Weak black liquor typically has a solids content of about 15% by weight, which is much too low for combustion. While the degree of concentration can vary, generally the weak black liquor is concentrated to approximately 65-85 wt % of dry solids. Once concentrated in the evaporators 14, the weak black liquor is referred to as concentrated black liquor. After the weak black liquor has been concentrated in the evaporators 14, it is subjected to a process for recovering pulping chemicals. As illustrated in FIG. 1, the concentrated black liquor is directed to a recovery boiler 16.

Typically the black liquor concentrated by the evaporators 14 is at a temperature of approximately 120° C. The black liquor is sprayed into the recovery boiler 16, which is typically operated at approximately 900° C. Effectively, the black liquor is atomized to droplets that, when sprayed into the recovery boiler 16, are exposed to hot gases and undergo drying, pyrolysis, and char conversion. At the end of the char conversation, the droplets have been converted to small particles of smelt that generally consist of inorganic material, $Na_2S$, $Na_2CO_3$, $Na_2SO_4$, and NaCl in ionic form. The char conversion is usually completed before the smelt exits the boiler. The resulting combustible gases are burned completely. This produces steam in surrounding water pipes of the boiler. The steam is then used in other mill processes and sometimes used to drive a steam turbine that produces electrical energy.

The resulting smelt enters a dissolving tank 19 where the smelt is dissolved in water to form what is referred to as green liquor. See FIG. 1. Green liquor is then sent to a causticizing plant 20, where the green liquor is reacted with lime, CaO, to convert the $Na_2CO_3$ to NaOH. $Na_2S$ formed in the dissolving tank 19 passes through the causticizing plant 20 unchanged.

The causticized green liquor is referred to as white liquor and mostly contains NaOH and $Na_2S$. White liquor produced by the causticizing plant is returned to the digester for reuse in pulping. In the causticizing plant 20, $CaCO_3$ (lime mud) is precipitated. Precipitated $CaCO_3$ from the causticizing reaction is washed, and sent to a lime kiln where it is heated to a high temperature to regenerate CaO for reuse.

Recovery boiler 16 also produces ash. The ash contains chlorine and potassium compounds, such as NaCl and KCl, that vaporize in the recovery boiler. Further, the ash contains sodium, sulfate and carbonate. As discussed above, one of the purposes of the chemical recovery process is to recover the sodium from the ash and reuse it in the pulping process. The process disclosed herein addresses a situation where the ash from the recovery boiler includes a relatively high content of carbonate. Under certain conditions, this high carbonate content of the ash impacts the efficiency of removing sodium in the form of sodium sulfate and sodium carbonate. The process disclosed in FIGS. 1 and 2 is designed to counter the potential adverse effects of a high carbonate content in the ash.

Figure 2:
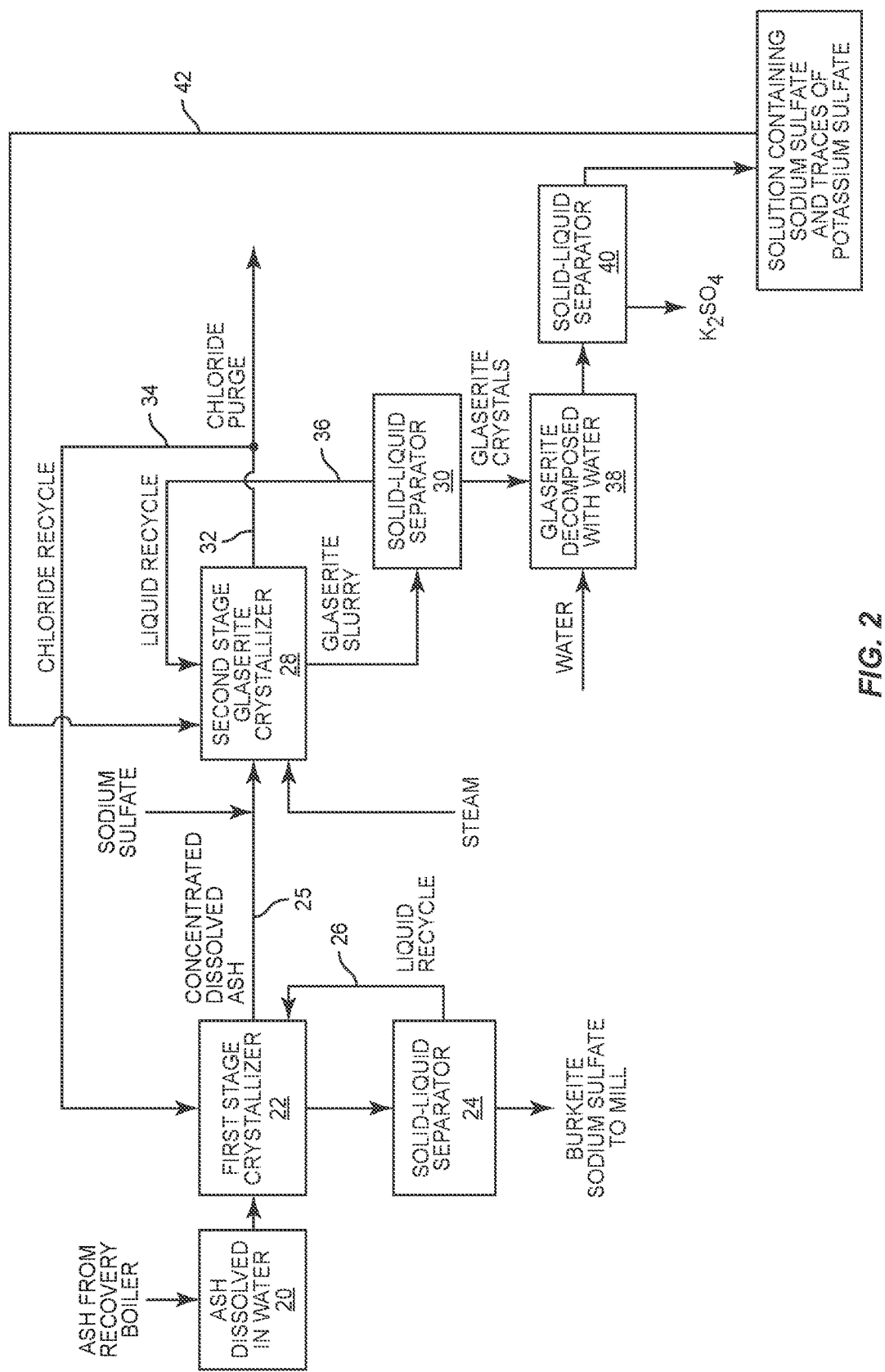
FIG. 2 is a schematic illustration showing details of the chemical recovery process.

Viewing FIGS. 1 and 2, ash from the recovery boiler 16 is directed to tank 20, where the ash is dissolved in water. Ash directed into tank 20 is dissolved to form a dissolved ash solution. The dissolved ash solution is directed to a crystallizer or a series of crystallizers 22. The First stage crystallizer 22 concentrates the dissolved ash solution causing sodium sulfate and burkeite ($2Na_2SO_4 \cdot Na_2CO_3$) to precipitate and form crystals. For ash with higher Carbonate contents burkeite ($2Na_2SO_4 \cdot Na_2CO_3$) and Sodium carbonate will crystallize in the first stage. A concentrate including the burkeite and sodium sulfate crystals is directed to a solid-liquid separator 24 that separates the burkeite, sodium carbonate and sodium sulfate crystals from the concentrate. The separated concentrate is recycled back to the First stage crystallizer 22 via line 26. The first stage crystallizer 22 also produces a concentrated purge or ash stream 25 that includes sodium, sulfate and carbonate, as well as chloride and potassium.

The concentrated purge stream from the First stage crystallizer 22 is directed to a glaserite crystallizer 28. Glaserite crystallizer 28 functions to precipitate and crystallize glaserite ($3K_2SO_4 \cdot N_2SO_4$). However, because of the high carbonate content of the concentrated ash, there is a tendency for sodium carbonate to precipitate and crystallize in the glaserite crystallizer at the expense of glaserite. To address this, sodium sulfate is added upstream of the glaserite crystallizer 28. By adding the sodium sulfate to the concentrated dissolved ash from the first stage crystallizer 22, this encourages or causes the crystallization of pure glaserite in the second stage, that is the glaserite crystallizer 28. Adding sodium sulfate allows more crystallization to occur in the second stage crystallizer 28 before producing sodium carbonate. The source of the sodium sulfate added to the concentrated purge from the evaporators 22 can be either dissolved make up salt cake or sequisulfate from a bleach plant.

Once in the second stage crystallizer 28, the concentrated purge stream having the added $N_2SO_4$ is subjected to cooling, and preferably adiabatic cooling. Adiabatic cooling is the decrease of the temperature of a system without the removal of heat. One common method of adiabatic cooling is to lower the pressure; because the temperature and pressure of a closed system are directly proportional, decreasing one will result in the decrease of the other. In one embodiment, the adiabatic cooling process is carried out until the crystallizer reaches a temperature of approximately 35-50° C. In the crystallizer 28, the adiabatic cooling process causes glaserite ($3K_2SO_4 \cdot Na_2SO_4$) to crystalize. In addition, the crystallization process may be enhanced by optionally heating the concentrate in the crystallizer 28. In one embodiment, this can be achieved by providing a heat exchanger in a concentrate recirculation line and directing steam into the heat exchanger to heat the concentrate as it is being recirculated through the crystallizer 28. Heating allows for additional crystallization to that provided by adiabatically cooling alone.

In the process of adiabatically cooling the concentrated purge stream 25 from the first stage crystallizer 22, the second stage crystallizer 28 produces another purge stream 32. Purge stream 32 typically includes a relatively rich concentration of chloride. Purge stream 32, having the relatively rich concentration of chloride, can be further treated or disposed of by conventional means. A portion of the concentrated purge stream 32 can be recycled via line 34 to the first stage crystallizer 22. The amount of the purge stream 32 directed from the plant or recycled back to the first stage crystallizer 22 will be adjusted to control the concentration of chloride in stream 32 and indirectly the concentration of chloride found in the black liquor directed to the recovery boiler 16.

Solid-liquid separator 30 separates the glaserite slurry into glaserite crystals and a liquid recycle stream 36. In the embodiment illustrated herein, the liquid recycle stream 36 is recycled back to the second stage crystallizer 28. The separated glaserite crystals are directed to a decomposing tank or chamber 38. Here, water or an aqueous solution is mixed with the glaserite and what follows is a leaching process. In tank 38 the leaching process occurs. Because of the differences in solubility, sodium sulfate is leeched from the glaserite crystals and becomes dissolved in the water or aqueous solution contained in tank 38. The mixture of potassium sulfate crystals and water containing a mixture of potassium sulfate and sodium sulfate is directed to a liquid solid separator 40 where the potassium sulfate crystals are removed. This produces a sodium sulfate solution that is recycled via line 42 to the crystallizer 28. Also the recycled sodium sulfate solution will include a significant amount of potassium sulfate. Once the sodium sulfate has been leached from the glaserite crystals, it follows that what is left is potassium sulfate ($K_2SO_4$) crystals. The potassium sulfate can be used as a fertilizer or can be disposed of in conventional ways.

The slurry from the second stage can be disposed of a as slurry by eliminating the solid liquid separator 30, Glaserite decomposer 38 and solid liquid separator 40 or the glaserite solids can be separated and disposed of or used as a fertilizer by eliminating the glaserite decomposer 38 and liquid solid separator 40

Thus, in this two-stage process for recovering sodium sulfate and sodium carbonate, the addition of sodium sulfate upstream of the second stage, causes pure glaserite to preferentially precipitate and crystallize over sodium carbonate. This effectively decouples the chemistry in the two stages, allowing crystallization of sodium carbonate and burkeite in the first stage and pure glaserite crystallization in the second stage. In addition to addressing the high content of carbonate in ashes and efficiently removing sodium sulfate and sodium carbonate for reuse, the process effectively reduces the concentration of chloride and potassium in the Kraft process. The removal of potassium as solid $K_2SO_4$ allows for higher potassium removal at high sodium and sulfate recovery. Further, the addition of sodium sulfate to the second stage crystallizer permits chloride to become saturated in the purge even for ashes with high carbonate levels.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of recovering wood pulping chemicals from black liquor produced in a wood pulping process in a pulp mill comprising:
    burning the black liquor in a recovery boiler and forming ash containing carbonate, sodium, potassium and chloride;
    dissolving at least a portion of the ash to form a dissolved ash solution;
    directing the dissolved ash solution to a first stage crystallization unit and concentrating the dissolved ash solution and precipitating sodium carbonate and burkeite and forming a concentrated dissolved ash solution including the precipitated sodium carbonate and burkeite;
    directing at least a portion of the concentrated dissolved ash solution to a downstream second stage crystallization unit and further concentrating the concentrated dissolved ash solution to form glaserite crystals which are directed from the second stage crystallization unit in a glaserite slurry;
    separating the glaserite crystals from the glaserite slurry; and
    reducing the tendency of sodium carbonate and burkeite to crystalize in the second stage crystallization unit and encouraging pure glaserite to crystallize in the second crystallization unit by adding sodium sulfate or a sulfate reagent to the concentrated dissolved ash solution or to the dissolved ash solution.

2. The method of claim 1 wherein the second stage crystallization unit produces a purge stream that is rich in chloride.

3. The method of claim 2 including recycling at least a portion of the purge stream containing the chloride to the first stage crystallization unit.

4. The method of claim 1 including directing the glaserite slurry to a solids-liquid separator and separating the glaserite slurry into glaserite crystals and a liquid recycle stream and recycling the liquid recycle stream back to the second stage crystallization unit.

5. The method of claim 4 including mixing water or an aqueous solution with the glaserite crystals and instituting a leaching process to leach sodium sulfate from the glaserite crystals and wherein the sodium sulfate becomes dissolved in the water or aqueous solution.

6. The method of claim 5 wherein the sodium sulfate solution is recycled back to the second stage evaporation unit.

7. The method of claim 5 wherein mixing the aqueous solution with the glaserite crystals and leaching sodium sulfate from the glaserite crystals forms potassium sulfate.

8. The method of claim 1 including adiabatically cooling the concentrated dissolved ash solution in the second stage crystallization unit.

9. The method of claim 1 wherein the second stage crystallization unit is a flash crystallizer and cools the concentrated dissolved ash solution to approximately 35° C. which results in the crystallization of glaserite.

10. The method of claim 1 wherein the second stage crystallization unit cools the concentrated dissolved ash solution to form the glaserite slurry and a mother liquor containing chloride.

11. The method of claim 10 wherein the mother liquor is directed from the second stage crystallization unit and is a mother liquor stream, and wherein there is provided a purge stream that extends from the mother liquor stream and is utilized to remove chloride from the dissolved ash solution.

12. A method of recovering wood pulping chemicals from black liquor produced in a wood pulping process and a pulp mill comprising:
- burning the black liquor in a recovery boiler and forming ash containing carbonate, sodium, potassium and chloride;
- dissolving at least a portion of the ash to form a dissolved ash solution;
- directing the dissolved ash solution to one or more evaporators and evaporating the dissolved ash solution to form a concentrated dissolved ash solution and precipitating sodium sulfate and sodium carbonate from the dissolved ash solution;
- separating the precipitated sodium sulfate and sodium carbonate from the concentrated dissolved ash solution;
- directing the concentrated dissolved ash solution to a crystallizer and adiabatically cooling the concentrated dissolved ash solution to produce a glaserite slurry and a purge stream containing chloride;
- reducing the tendency of sodium carbonate to crystallize in the crystallizer and encouraging pure glaserite to crystalize in the crystallizer by adding a sulfate source to the concentrated dissolved ash solution prior to the concentrated dissolved ash solution reaching the crystallizer;
- directing the glaserite slurry to a solids-liquid separator and separating glaserite crystals from the glaserite slurry;
- wherein the solids-liquid separator produces a liquid recycle stream and wherein the liquid recycle stream is recycled to the crystallizer that produces the glaserite slurry;
- separating sodium sulfate from the glaserite crystals by leaching the sodium sulfate from the glaserite crystals; and
- recycling a portion of the purge stream containing the chloride to the one or more evaporators that concentrates the dissolved ash solution.

13. The method of claim 12 including recycling the sodium sulfate separated from the glaserite crystals to the crystallizer.

* * * * *